United States Patent Office.

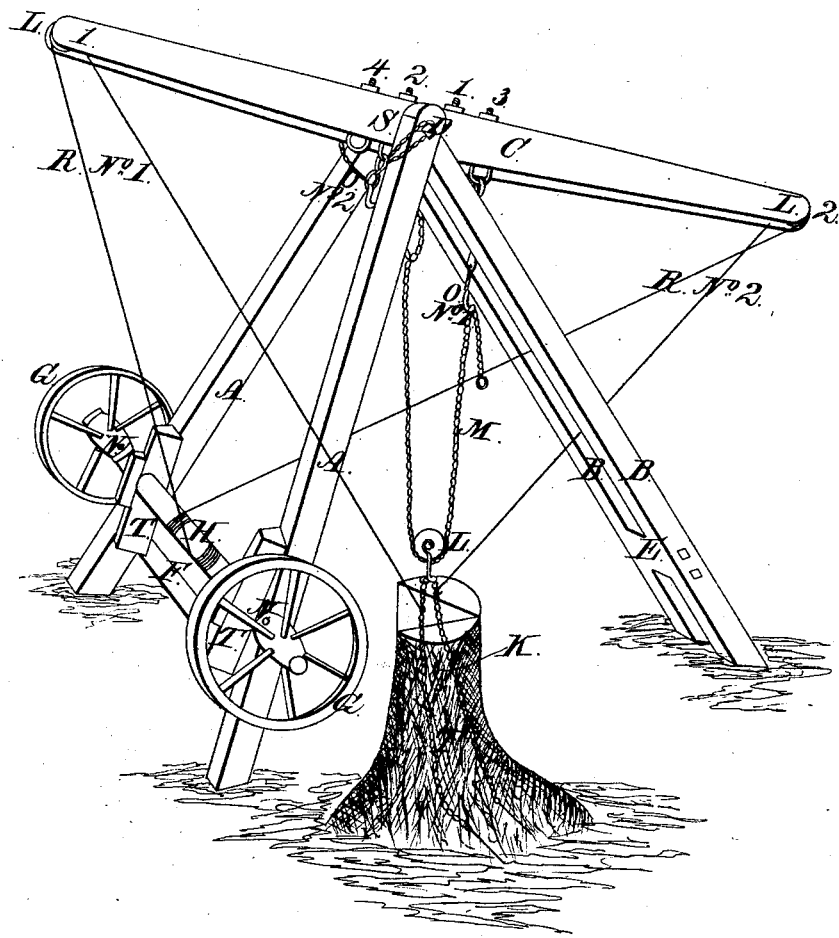

GARRET J. OLENDORF, OF MIDDLEFIELD, NEW YORK, ASSIGNOR TO HIMSELF AND JOHN WOOD.

Letters Patent No. 69,832, dated October 15, 1867.

IMPROVEMENT IN STUMP-EXTRACTOR.

The Schedule referred to in these Letters Patent and making part of the same.

TO ALL WHOM IT MAY CONCERN:

Be it known that I, GARRET J. OLENDORF, of the town of Middlefield, in the county of Otsego, and State of New York, have invented a new and useful machine for pulling stumps of trees, which I call a Stump-Lifter; and I do hereby declare that the following is a full, clear, and exact description of the construction and operation of the same, reference being had to the annexed drawings, and to the letters of reference marked thereon, making a part of this specification.

A A are scantling or small square timber, about four by four inches, and twelve feet long. F is a small timber framed into the scantlings A A, securing them together at the right angle. B B are scantling, three by four inches, and about thirteen feet long. E is a small timber framed into the scantling B B, securing them together the proper distance apart for the beam to operate between them. C is a lever-beam, about four by eight inches in the centre, and smaller at the ends, but the size of the machine may be varied, according to the work to be performed by it. D is a heavy iron bolt, which passes through the scantling near the top and through the centre of the beam, connecting them together, and allowing the beam to be operated as desired. G G are wheels of any kind; common wagon-wheels may be used. H is the axle or drum, around which the ropes are wound that operate the machine. N N are pins put through the hubs of the wheels and the axle, to prevent the wheels from turning upon said axle, or they may be tied with a rope or chain to hold them while the machine is being operated, but to move the machine from one place to another the pins N or ropes are removed, so as to let the wheels turn upon the axle. The machine is shut together and turned down over the wheels, which turns said wheels to the ground, with most of the weight of the machine resting upon them, and is thus moved from place to place on the aforesaid wheels. T T are boxes which connect the axle H to the machine, and in which it operates. Said boxes may be made of wood or iron. J is the stump, and K is the chain fastened or hitched on to it. L L L are pulleys. M is a chain with which the stump is raised. 1, 2, 3, 4 are iron loops on the under side of the lever-beam, the shanks of which pass through said beam, and are secured on the top by nuts. O O are swivel-hooks, but straight or reel-hooks may be used, or swivel and hook. R R are ropes, one end of which is wound in opposite directions on to the axle or windlass H, the opposite ends passing over the pulleys in the lever-beam, and thence to the stump, and are hitched in any suitable manner to said stump, or they may be hitched to the frame of the machine; but by thus hitching you lose some power. S is a chain on the top of the machine, to which the chain M is hitched.

To operate my machine place it over the stump, put a chain around and over said stump, passing it through the clevis of the pulley, then hitch one end of chain M to chain S the other end, passing around the pulley on the stump, is hitched by swivel hitch-up hook O into loop No. 1, on the beam; then turn the wheels the way that winds up the rope that passes over pulley L, No. 1, which will draw down that end of the beam, and thereby raise loop No. 1, which is near the centre on the opposite side of the centre-pin; then hitch hook O, No. 2, into the chain M, one or more links below the other; then turn the wheels in the opposite direction, which will draw on rope R, No. 2, and pull down that end of the beam, thereby raising hook and loop No. 2; then hitch in hook No. 1 again one link below No. 2; then turn your wheel again, so as to draw on rope No. 1, and so on, alternately operating the beam and raising one link at a time. Or, if your stump is small, you can hitch the hooks into the loops Nos. 3 and 4, which are further from the centre, and consequently will raise further at each operation of the machine; or, the pulley on the stump may be dispensed with, and the chain M hitched one end to the hitch-up hook and the other end to the stump.

What I claim as my invention, and desire to secure by Letters Patent, is—

1. I claim lever-beam C, supported in the centre by crotched pieces or frame, operating as described, for the purpose specified.

2. I claim swivel, reel, or straight hitch-up hooks, or swivel and hook, combined with and operated by lever-beam C, as described and set forth for the purpose specified.

3. I claim ropes R R, hitched to either the stump or frame, going over pulleys in the beam to the axle or windlass, by which the machine is operated, when used as described and set forth for the purpose specified.

GARRET J. OLENDORF.

Witnesses:
    SAMUEL HARPER,